(12) United States Patent
Kashiwagi et al.

(10) Patent No.: US 11,263,176 B2
(45) Date of Patent: Mar. 1, 2022

(54) INFORMATION ACCUMULATION APPARATUS, DATA PROCESSING SYSTEM, AND PROGRAM

(71) Applicant: NIPPON TELEGRAPH AND TELEPHONE CORPORATION, Tokyo (JP)

(72) Inventors: Keiichiro Kashiwagi, Musashino (JP); Hisaharu Ishii, Musashino (JP); Yui Yoshida, Musashino (JP); Tomoyuki Fujino, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/762,884

(22) PCT Filed: Sep. 20, 2018

(86) PCT No.: PCT/JP2018/034786
§ 371 (c)(1),
(2) Date: May 8, 2020

(87) PCT Pub. No.: WO2019/092990
PCT Pub. Date: May 16, 2019

(65) Prior Publication Data
US 2021/0173813 A1    Jun. 10, 2021

(30) Foreign Application Priority Data
Nov. 9, 2017 (JP) .............................. JP2017-216648

(51) Int. Cl.
*G06F 16/14* (2019.01)
*G06F 16/182* (2019.01)
*G06F 16/17* (2019.01)

(52) U.S. Cl.
CPC .......... *G06F 16/148* (2019.01); *G06F 16/156* (2019.01); *G06F 16/1734* (2019.01); *G06F 16/1824* (2019.01)

(58) Field of Classification Search
CPC .... G06F 12/00; G06F 16/1734; G06F 16/148; G06F 16/156; G11B 20/10
(Continued)

(56) References Cited

U.S. PATENT DOCUMENTS 6,993,246 B1 * 1/2006 Pan .................... G11B 27/10
386/201
8,156,110 B1 * 4/2012 Luo .................... G06F 16/23
707/714

(Continued)

FOREIGN PATENT DOCUMENTS

| CN | 104394380 A | 3/2015 |
|---|---|---|
| JP | 2014164382 A | 9/2014 |
| JP | 2016187122 A | 10/2016 |

OTHER PUBLICATIONS

International Preliminary Report on Patentability from counterpart PCT/JP2018/034786, including the English translation of the Written Opinion, dated May 12, 2020.
(Continued)

*Primary Examiner* — Shahid A Alam
(74) *Attorney, Agent, or Firm* — Harness, Dickey & Pierce, P.L.C.

(57) ABSTRACT

When data generated by devices (30) arrive in an order of time instants of generation of the data, the data are additionally described (written) to an actual data recording unit (12b) in an order of arrival of the data, and, meanwhile, a time instant, at which the data additionally written to the actual data recording unit (12b) is generated, a data size, and a position of postscript in an actual data file are additionally
(Continued)

written, as index information, to an index file (12a) having a file name corresponding to the actual data file in which the data is recorded.

10 Claims, 10 Drawing Sheets

(58) Field of Classification Search
USPC .......................................................... 707/705
See application file for complete search history.

(56) References Cited

U.S. PATENT DOCUMENTS

| | | | | |
|---|---|---|---|---|
| 9,317,537 | B2* | 4/2016 | Fakeih | .................... G06F 17/11 |
| 2004/0168084 | A1* | 8/2004 | Owen | ..................... G06F 21/10 |
| | | | | 726/26 |
| 2006/0195876 | A1* | 8/2006 | Calisa | .................... H04N 7/181 |
| | | | | 725/105 |
| 2011/0078141 | A1* | 3/2011 | Fakeih | .................... G06F 16/21 |
| | | | | 707/736 |
| 2011/0246603 | A1* | 10/2011 | Lee | .................. H04N 21/23611 |
| | | | | 709/217 |
| 2016/0217013 | A1* | 7/2016 | Song | .................... G06F 16/2455 |
| 2016/0286254 | A1* | 9/2016 | Hirose | ............... G11B 27/3036 |
| 2017/0139968 | A1 | 5/2017 | Baum et al. | |

OTHER PUBLICATIONS

Hiroki Akama, et al., "Design and Evaluation of a Data Management System for WORM Data Processing", The IPSJ Journal 49.2(2008): pp. 749-764.

Seiichi Ohkoma, et al., "Information Storage and Retrieval", The IPSJ Magazine 7.6 (1966) pp. 318-326.

International Search Report (English and Japanese) issued in PCT/JP2018/034786, dated Nov. 20, 2018; ISA/JP.

Toshihiko Okazaki, "Norton Utilties 3 Usage Guide For Windows", Ohmsha, First Edition, pp. 122-124 (Apr. 14, 1998).

* cited by examiner

US 11,263,176 B2

INFORMATION ACCUMULATION APPARATUS, DATA PROCESSING SYSTEM, AND PROGRAM

CROSS-REFERENCE TO RELATED APPLICATIONS

This is a U.S. national phase application under 35 USC 371 of international application PCT/JP2018/034786, filed Sep. 20, 2018, which claims priority to Japanese patent application No. 2017-216648, filed on Nov. 9, 2017. The entire disclosures of the above applications are incorporated herein by reference.

FIELD

The present invention relates to an information accumulation apparatus which can quickly read and write IoT data, a data processing system, and a program.

BACKGROUND

In recent years, in a system which is constituted by connecting various devices, such as sensors capable of acquiring various data, to a network, attention has been paid to the IoT (Internet of Things) which utilizes data generated by the devices.

In the system using the IoT, since data are continuously or periodically acquired from various devices, a database that can quickly write and read a great amount of data, which is successively generated with the passing of time, is needed.

In addition, in the fields using the IoT, in many cases, various data are acquired by using a large number of various devices. Thus, it is required that the devices to be used be inexpensive. Therefore, in many cases, it is difficult to utilize expensive devices including large-capacity memories.

On the other hand, conventionally, as a database in which data successively generated with the passing of time are written, use is made of postscript data such as PostgreSQL (see, for example, Non Patent Literature 1).

In some of postscript databases, in some case, a process of, for example, creating an index is performed when data is written to a disk. The index in this context refers to search data which is created so as to quickly search or extract data written in a file.

In general, if the number of indices, or the number of kinds of indices, which are generated for data, the write of which is requested by an application, increases, the generation of indices or the write of index data becomes an overhead of the entire write process in accordance with the number of indices or the kinds of indices.

In addition, since the size of data is not limited to a fixed length, if postscript is performed without executing a special process at a time of data write, an operation amount O(n) of linear search of data becomes necessary at a time of data read, and there arises a problem that the read speed lowers in accordance with an increase of data (see, for example, Non Patent Document 2).

A process of, for example, index generation at a time of data write increases the read speed of data, but it is desirable to decrease as much as possible a processing load at a time of data write in a database for the IoT in order to secure a write speed.

CITATION LIST

Non Patent Literature

Non Patent Literature 1: Akama Hiroki, et al. "Design and Evaluation of a Data Management System for WORM Data Processing", the IPSJ Journal 49.2(2008): 749-764.
Non Patent Literature 2: Ohkoma Seiichi, Nishimura Hirohiko, and Konno Seishi, "Information Storage and Retrieval", the IPSJ Magazine 7.6 (1966).

SUMMARY

A feature of IoT data is that data sequentially generated by devices with the passing of time arrive at the database in the order of generation, unless the order of data changes while the data is transmitted through a network or the like.

In addition, in the IoT, in many cases, necessary data is read out from the database by designating a time instant. Thus, a database is required, in which the speeds of search and read processes based on time instants are high. In particular, since there are many applications which refer to latest values at most recent time instants, it is also important that the read speed of latest values is high.

In this manner, in the fields using the IoT, such a database is required that the data, which are sequentially generated by the devices with the passing of time and arrive at the database in the order of generation, are quickly written in the database, and the data can be quickly searched and read out by designating information such as date/time or the like (a specific time instant, a time range, and a most recent time instant).

As described above, in the conventional art, use is made of the method in which the read speed is increased by providing indices on memory areas of the database. However, there is a trade-off relation between the size of indices and the search performance.

Further, since the amount of data used in the IoT is enormous, the number of indices is also enormous as a matter of course. Thus, there is a problem that processing with saving of a memory is difficult.

Besides, there is secondary problem. In the IoT, there is a case in which the data generated by the devices and media data with a greater data amount than this data, such as images and moving images, are processed by a common database. However, it is difficult to accumulate these data by a common scheme, because of differences between data sizes and characteristics.

The present invention has been made in consideration the above problems. The object of the invention is to provide an information accumulation apparatus which, firstly, enables saving of a memory and high-speed data read/write by minimizing processing at a time of write, and which, secondly, enables, by a common database, high-speed read/write of data generated by devices and media data such as images, and to provide a data processing system, and a program.

An information accumulation apparatus according to the present invention comprises: an index recording unit configured to record an index file including index information which is a data sequence including a time instant of generation of data, and position information of the data to be recorded, the index information being arranged in an order of time instants of generation of the data, the index file including a file name corresponding to the time instant of the generated data; an actual data recording unit configured to record an actual data file including a file name having a rule which enables unique and mutual correlation by a first calculation amount with the file name of the index file, the actual data file being configured such that the data is written to the area indicated by the position information described in the index information; a write processor configured to write the data to the actual data file, and to write the position information of the data which is written in the actual data file, and the time instant of the generation of the data, to the index file as the index information; and a read processor configured to read, when data that is a read target is designated based on a time instant, the data from the actual data file, based on the index information in the index file including the file name corresponding to the time instant.

According to the present invention, firstly, saving of a memory and high-speed data read/write are enabled by minimizing processing at a time of write, and, secondly, high-speed read/write of data generated by devices and media data such as images is enabled by a common database.

DETAILED DESCRIPTION

Hereinafter, an information accumulation apparatus, a data processing system and a program according to embodiments of the present invention will be described with reference to the accompanying drawings.

Figure 1:
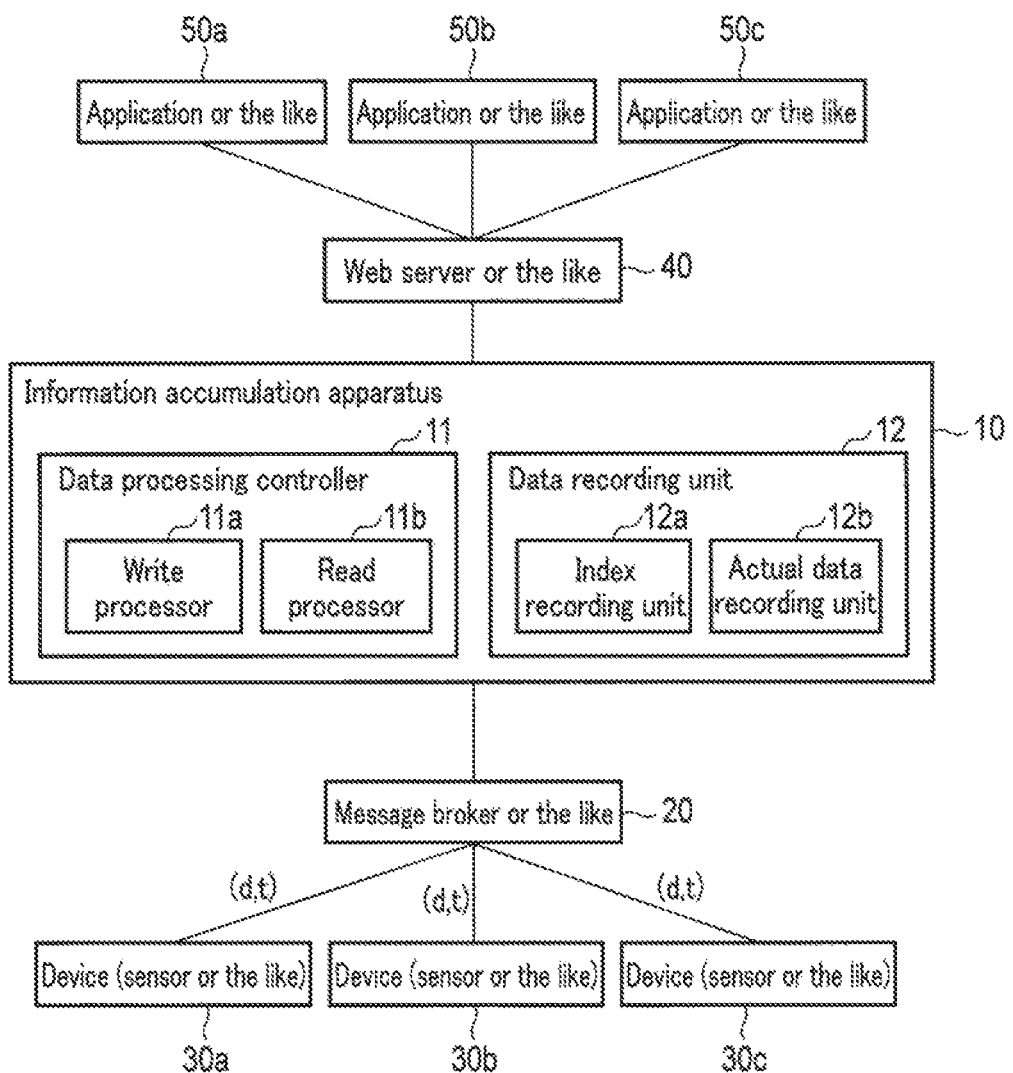
FIG. 1 is a view illustrating a data processing system including an information accumulation apparatus 10 of an embodiment.

FIG. 1 is a functional block diagram illustrating a configuration of a data processing system including an information accumulation apparatus 10 of an embodiment.

The data processing system is configured to include the information accumulation apparatus 10, a message broker 20, devices 30 (sensors) (30a to 30c), a Web server 40, and applications 50 (50a to 50c).

The devices (sensors) 30 (30a to 30c) correspond to data generation apparatuses each having a function of generating various data d which are measured continuously or periodically, and time instants t at which the data d are measured, and transmitting the data d and time instants t to the message broker 20. Hereinafter, the device (sensor) 30 is simply referred to as "device 30".

In the present embodiment, the unique characteristic of the IoT, i.e. the characteristic that the data d transmitted from the devices 30 are transmitted to the message broker 20 in the order of generation, is utilized, and the data d are managed by the information accumulation apparatus 10.

Thus, the device 30 is configured such that the data d and time instants t transmitted to the information accumulation apparatus 10 do not need to be accumulated in the device 30.

Thereby, in the present data processing system, the devices 30, which are inexpensive, can be adopted.

The message broker 20 has functions of receiving the data d generated by the devices 30 and the time instants t at which the data d are generated (hereinafter, also referred to as "generation time instants t"), and transmitting the data d and time instants t into the information accumulation apparatus 10.

The information accumulation apparatus 10 has a function of writing in a data recording unit 12 the data d received from the message broker 20, according to the generation time instants t by the devices 30, and a function of reading the data d from the data recording unit 12 according to a data read request with the designated time instant t from the application 50 via the Web server 40.

Upon receiving the data request from the application 50 (50a to 50c), the Web server 40 accesses the information accumulation apparatus 10, receives the data d that is read from the data recording unit 12 of the information accumulation apparatus 10, and transmits the data d to the application 50 (50a to 50c).

The information accumulation apparatus 10 includes a data processing controller 11 and the data recording unit 12.

The data processing controller 11 includes a CPU (Central Processing Unit) which controls the information accumulation apparatus 10 according to a data processing control program prestored in a storage unit (not shown) such as a ROM. The CPU, which operates according to the data processing control program, functions as a write processor 11a which executes a write process, and as a read processor 11b which executes a read process.

In addition, the write processor 11a of the data processing controller 11 has a function of writing the received data d in the actual data recording unit 12b according to a write process, which will be described in detail in the description of the operation below, and writing, in an index recording unit 12a, "time t (date/time) of generation, amount (size) of data d, and write area (read start position) of data d in the actual data recording unit 12b" as index information IJ composed of a data sequence of a fixed length relating to the data d, in the order of time instants of the generation of the data d by the devices 30.

Furthermore, the read processor 11b of the data processing controller 11 has a function of searching and acquiring, by using a specific time instant t or specific time range as a query (information request), an index file (1~n, n: a natural number) including the time instant t from the index recording unit 12a, according to a read process, which will be described in detail in the description of the operation below, and also has a function of searching the index information IJ which is provided in the searched and acquired index file and includes the time instant t in the data sequence.

Note that when the index file 1 to index file n are not distinguished, the index file is simply referred to as "index file".

Figure 2:
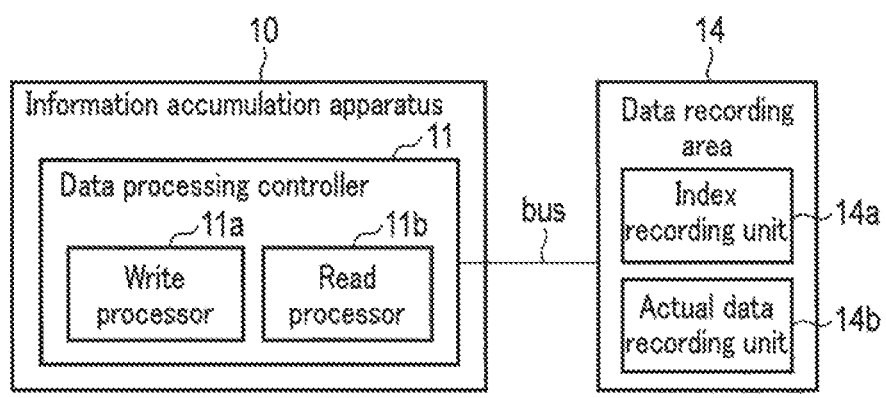
FIG. 2 is a view illustrating a case in which a data recording unit 12 is disposed outside the information accumulation apparatus 10.

FIG. 2 is a view illustrating a case in which the data recording unit 12 (hereinafter referred to as "data recording area 14") included in the information accumulation apparatus 10 shown in FIG. 1 is disposed outside the information accumulation apparatus 10.

The data recording area 14 corresponds to the data recording unit 12 which is provided on the outside of the information accumulation apparatus 10, and may be configured to be connected to the information accumulation apparatus 10 via, for example, a bus BUS.

Specifically, the data recording area 14 includes an index recording unit 14a and an actual data recording unit 14b, which have the same functions as the index recording unit 12a and actual data recording unit 12b. Hereinafter, a description will be given by using the data recording unit 12.

Figure 3:
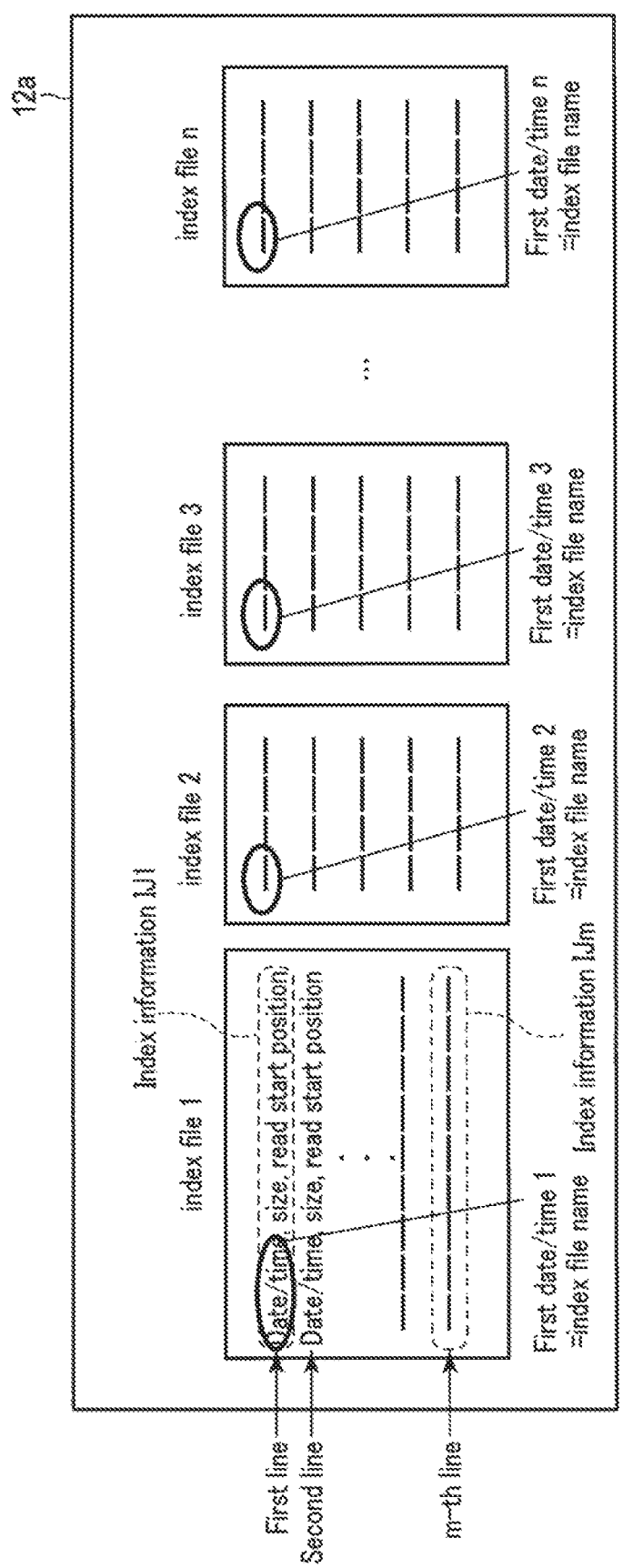
FIG. 3 is a view illustrating, as an example, an n-number of index files (1~n, n: a natural number) stored in the index recording unit 12a provided in the information accumulation apparatus 10.

FIG. 3 is a view illustrating, as an example, an n-number of index files (1~n) stored in the index recording unit 12a.

Hereinafter, attention is paid to the index file 1, and a description of the other index files 2 to n is omitted.

As illustrated in the Figure, index information IJ1 to index information IJm are sequentially recorded from a starting line (first line) to a last line (m-th line) in the index file 1. When index information IJ1 to index information IJm are not distinguished, the index information is simply referred to as "index information IJ".

In each index information IJ, "information relating to data d (date/time, size, read start position)" is described. In the first line, for example, the index information IJ1 including an earliest time instant t in the index file 1 is disposed. In the last m-th line, the index information IJm including a latest time instant t in the index file 1 is disposed. Note that the date/time may be information which is created by converting the date/time.

In addition, as an example of the index information IJ, use may be made of 32-byte information composed of "time instant expressed by 64-bit binary expression", "data size", "data record position POS in actual data file" and "system clock at time of data write".

Further, if the index information up to the index information IJm is recorded in the index file 1, and the file 1 reaches an allowable capacity, a new index file 2 is generated, and index information IJ is sequentially recorded from the first line of the index file 2.

In order to enhance the data read/write speed and the efficiency of use of the storage area, the file size (capacity) of the index file can be set to a multiple of the paging size of an OS (Operating System).

A process in which a kernel of the OS executes read/write from/to an auxiliary storage device such as an HDD (Hard Disk Drive) or SSD (Solid State Drive) is executed in units of a paging size. Thus, by setting the size of the index file, which is particularly frequently read/written, to a multiple of the paging size, the read/write speed of the index file and the efficiency of use of the storage area are enhanced.

Here, the paging size refers to, for example, "a unit of a data sequence constituted by data recorded in memory cells MC of 1 row×k columns" in the memory cells MC which constitute a memory cell array MCA and are arranged, for example, in 1 row×k columns.

Note that an index file 3, . . . , an index file n are newly created when necessary, and the index information IJ is sequentially recorded from the index file 3 to the index file n.

In addition, file names, which are set for the index file 3, . . . , index file n, may be created by adopting any one of the following first to third methods.

Specifically, firstly, as an example of a predetermined criterion for selecting, for example, one of dates/times described in the index information IJ, the date/time of the data d described in the first line of the index file is selected, and this may be used as an index file name.

Secondly, as an example in which an index file name and an actual data file name are set by a simple rule which can execute mutual conversion with a small calculation amount, by using the date/time of the data d selected in the index file, a date/time expressed by 64-bit integer with no sign may be described in the index information IJ, and, besides, a file name including a character string, in which a date/time described by a 128-bit binary expression is coupled by hexadecimal ASCII characters in units of four bits, may be used as these file names.

Thirdly, as an example of the combination between the criterion and the rule, that one of the dates/times described by 64-bit binary expressions in the index information IJ, which is described in the first line of the index file, is selected, and a character string expressed by 128-bit hexadecimal notation may be used as parts of the index file and actual data file.

Figure 4:
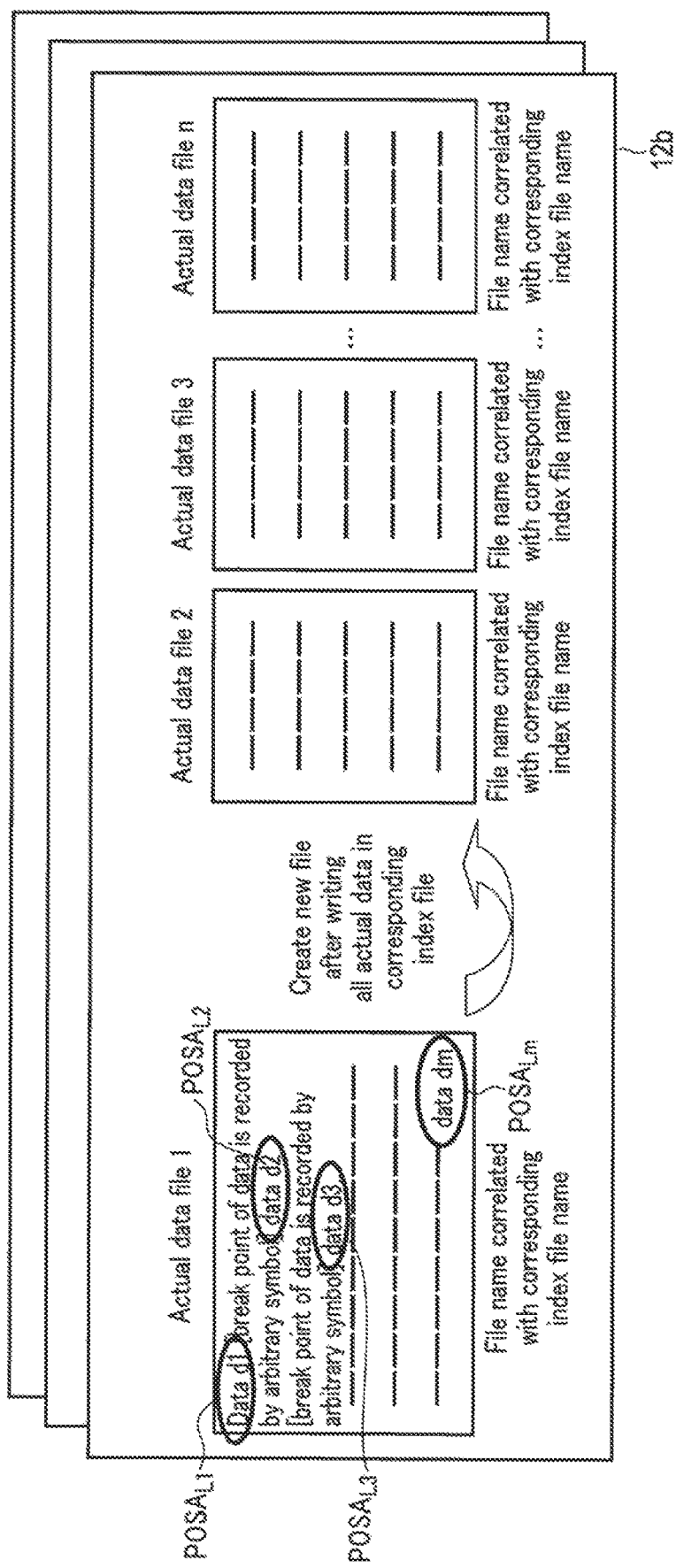
FIG. 4 is a view illustrating an n-number of actual data (1~n, n: a natural number) stored in an actual data recording unit 12b provided in the information accumulation apparatus 10.

FIG. 4 is a view illustrating an n-number of actual data files (1~n, n: a natural number) stored in the actual data recording unit 12b.

Hereinafter, attention is paid to the actual data file 1, and a description of the other actual data files 2 to n is omitted.

As illustrated in the Figure, in the actual data file 1, from the beginning, for example, data d1 is recorded in an area 1 ($POSA_{L1}$), data d2 is recorded in an area 2 ($POSA_{L2}$), . . . , and data dm is recorded in an area m ($POSA_{Lm}$). Note that $POSA_{L1}$ to $POSA_{Lm}$ are position information in the actual data file 1 in which the data d of write targets are recorded. For example, an arbitrary sign for distinguishing the data d1 and data d2 may be inserted between the data d1 and data d2.

In addition, the data d1 to data dm correspond to the index information IJ1 to index information IJm from the first line to m-th line recorded in the index file 1.

Specifically, the data d1 to data dm corresponding to the index information IJ1 to index information IJm recorded in the index file 1 are recorded in the actual data file 1.

The same relationship is established between, for example, the index file n and actual data file n.

In addition, in order to easily and quickly enable a read process of data d from the actual data file on the basis of the index file, for example, a file name corresponding to the index file 1 is given to the actual data file 1. The same relationship is established between the index file n and actual data file n.

Even when BLOB (Binary Large Object) data of an image, a moving image and audio with large capacity, which will be described below, is recorded in, for example, the actual data file 1, the same correspondence relation is maintained between the actual data file 1 and index file 1.

Specifically, the name of an actual data file, in which BLOB data is recorded, is set based on a generation time instant of the corresponding BLOB data described in the index information IJ in the index file. Concretely, the actual data file name and the generation time instant of the BLOB data are correlated by a simple rule which enables unique and mutual conversion with a small calculation amount.

Figure 5:
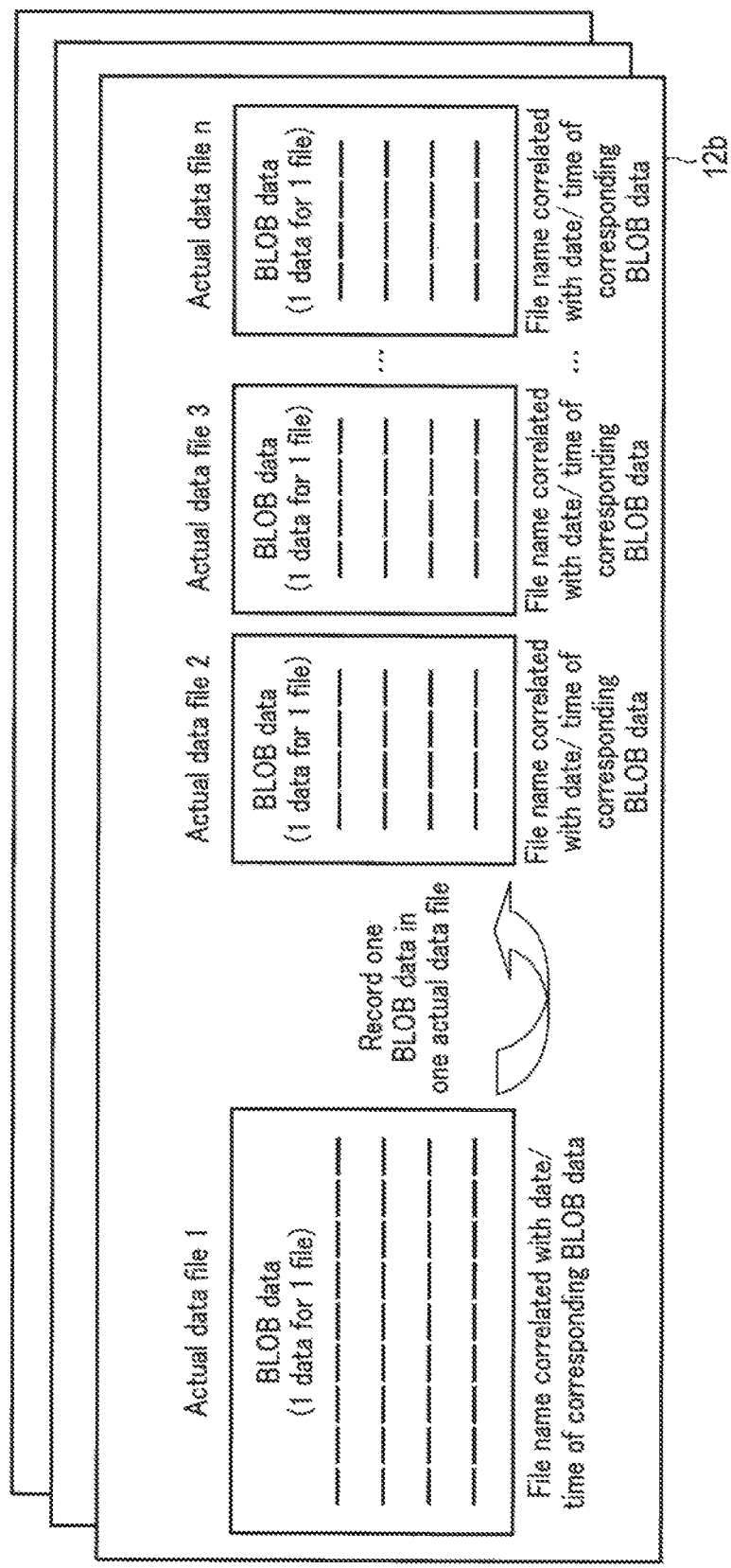
FIG. 5 is a view illustrating an n-number of actual data (1~n, n: a natural number) in a case in which BLOB data is recorded in the actual data recording unit 12b.

FIG. 5 is a view illustrating a case in which the BLOB data is recorded in the actual data recording unit 12b. An actual data file 1 to an actual data file n (1~n, n: a natural number) are recorded in the actual data recording unit 12b.

Hereinafter, attention is paid to the actual data file 1, and a description of the other actual data files 2 to n is omitted.

As illustrated in the Figure, in the actual data file 1, one BLOB data is recorded. Specifically, if an n-number of actual data files 1 to n are recorded in the actual data recording unit 12b, an n-number of BLOB data in total are recorded.

By adopting this configuration, the data d generated by the device 30 and the BLOB data of an image, a moving image or the like can be processed by a common database. For example, such a problem is solved that it is difficult to accumulate the data d and BLOB data by a common scheme because of differences in size and characteristic between the data d and BLOB data.

In the information accumulation apparatus 10 having the above configuration, the CPU in the data processing controller 11 controls the operations of the respective components according to instructions described in the data processing control program, and the software and hardware cooperates to perform the functions of various data write processes and data read processes, which will be described in the description of operations below.

Next, (write and read) operations by the information accumulation apparatus 10 will be described.

[Write Process (t, d)]

Figure 6A:
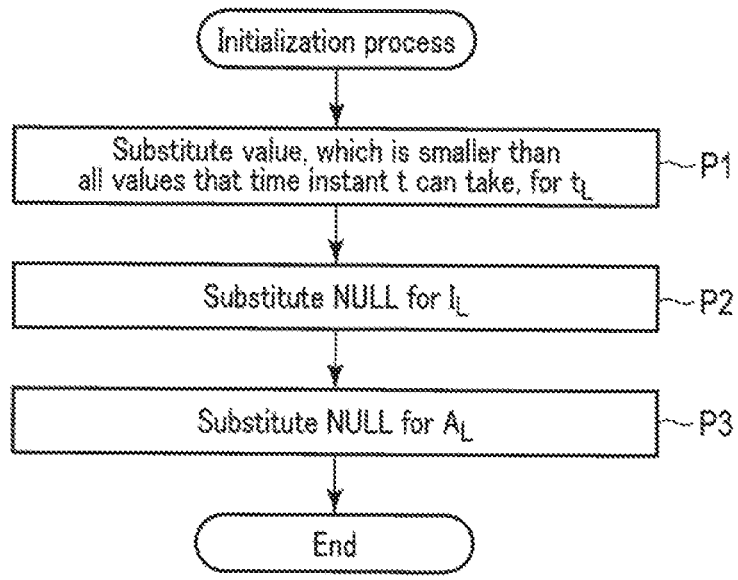
FIG. 6A is a flowchart illustrating processing steps (an initializing process) used in a write process of the information accumulation apparatus 10.
Figure 6B:
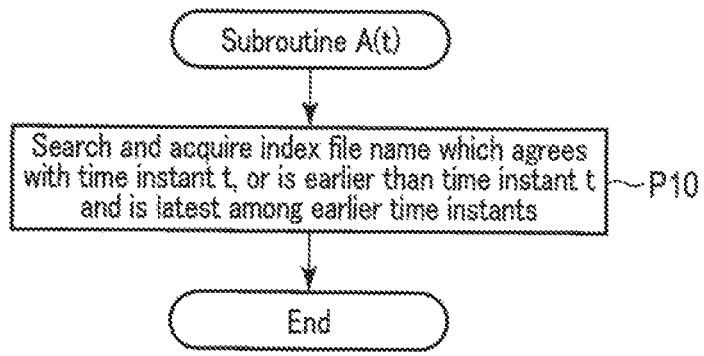
FIG. 6B is a flowchart illustrating a processing step (a subroutine) used in the write process of the information accumulation apparatus 10.
Figure 6C:
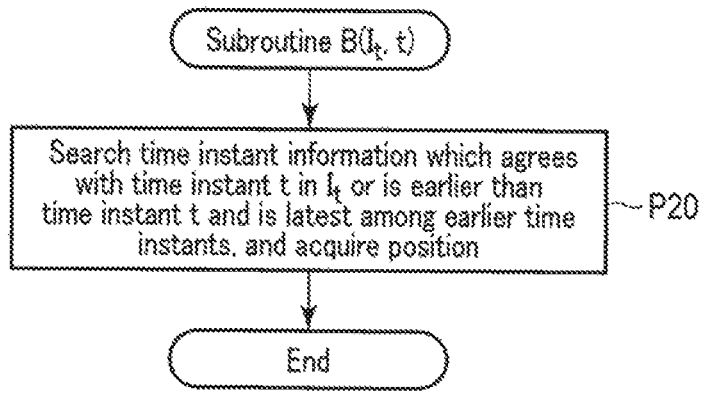
FIG. 6C is a flowchart illustrating a processing step (a subroutine) used in the write process of the information accumulation apparatus 10.

FIG. 6A, FIG. 6B and FIG. 6C are flowcharts illustrating processing steps used in a write process (steps S1 to step S10) of data d (to be described later).

Specifically, FIG. 6A illustrates an initialization process. FIG. 6B illustrates a subroutine A(t) showing a process of searching an index file for data d which is a write target. FIG. 6C illustrates a subroutine $B(I_t, t)$ for acquiring position information POS of a position at which index information IJ is inserted in an index file that is a write target.

Note that the subroutine A(t) and subroutine $B(I_t, t)$ are process flows which are used when the data d cannot arrive at the information accumulation apparatus 10 in the order of generation of the data d, and the data d having a reversed order during traveling through the communication path is written by interrupt in the index file and actual data file in which the data d is to be written.

Here, in FIG. 6A, FIG. 6B and FIG. 6C, $t_L$: a generation time instant t of latest data d of all written data d, $I_L$: an index file including index information IJ relating to the data d of the time instant $t_L$, and $A_L$: an actual data file including the data d of the time instant $t_L$.

To start with, the initialization process is executed, and an earlier time instant (e.g. 19XX, YY (month)/ZZ (day), NN (hour), MM (minute), LL (second)) than generation time instants t (e.g. 20xx, yy (month)/zz (day), nn (hour), mm (minute), ll (second)) of all data d, which will be generated by the devices 30 in the future, is substituted for the parameter $t_L$ (step P1).

Then, "NULL" is substituted for the parameter $I_L$ for the index file (step P2), and similarly "NULL" is substituted for the parameter $A_L$ for the actual data file in the actual data recording unit 12b, and thus the initialization process is finished (step P3).

By this initialization process, the index recording unit 12a and actual data recording unit 12b are set in an empty state in which neither an index file nor an actual data file is generated, and, as a matter of course, data d is not recorded.

Next, by the subroutine A(t) process illustrated in FIG. 6B, an index file name corresponding to a time instant t of generation of data d, or an index file name, which is earlier than the time instant t and is latest among the earlier time instants, is searched and acquired (step P10).

Here, each index file name is described by binary data composed of a data sequence of a fixed length (e.g. a data sequence of "0" and "1" of 8 bytes). Thus, a file can be quickly searched by a system call of the OS, such as a binary search that is one of search methods.

Further, by the subroutine $B(I_t, t)$ illustrated in FIG. 6C, in the index file obtained by the process of the subroutine A(t), index information IJ including the time instant t at which the data d that is a write target is generated, or index information IJ which is earlier than the time instant t and is latest among the earlier time instants, is searched, and position information POS (line), in which new index information IJ is inserted, is acquired (step P20).

The acquired position information POS (line) is substituted for a parameter $POSI_t$ (to be described later).

Based on the above-described initialization process, subroutine A(t) process and subroutine $B(I_t, t)$ process, a main write process to be described below is executed.

Figure 7:
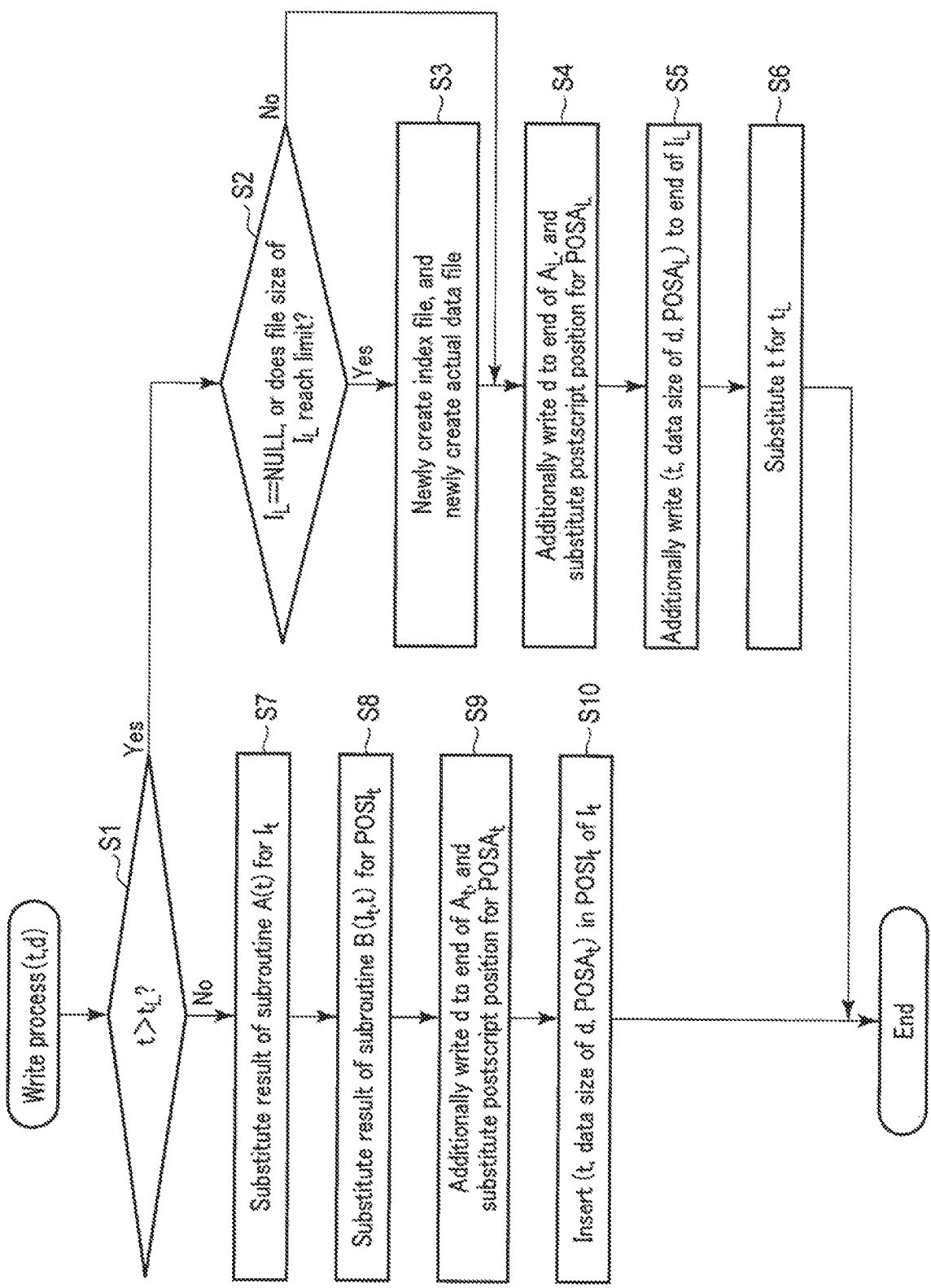
FIG. 7 is a flowchart illustrating a write process of data d of the information accumulation apparatus 10.

FIG. 7 is a flowchart illustrating a write process of data d, including the subroutine A(t) process and subroutine $B(I_t, t)$.

Here, in FIG. 7, $I_t$: an index file in which index information IJ of data d generated at a time instant t is written, $POSI_t$: a position at which index information IJ relating to data d at the time instant t is written in $I_t$, $A_t$: an actual data file in which data d generated at the time instant t is written, $POSA_t$: a position at which data d is written in $A_t$, and $POSA_L$: a position at which data d generated at the time instant t is written in $A_L$.

To start with, when the generation time instant t of data d that is a write target is later than the parameter $t_L$ (step S1, YES), i.e. when it is determined that data d generated at a time instant t, which is later than the initial value (a time instant earlier than any of generation time instants t) stored in the parameter $t_L$ by the initialization process, normally arrives at the information accumulation apparatus 10 according to the generation time instant t thereof (step S1, YES), it is then determined whether an index file is created in the index recording unit 12a (expressed as $I_L$==NULL in the Figure), or, it is determined, if an index file is already created, whether the capacity of the index file, in which the data d is to be written, reaches an upper limit (step S2)

As a result, if it is determined that an index file has not yet been created ($I_L$==NULL) or that the capacity of the already created index file reaches the upper limit (step S2, YES), "1"

(in the case where an index file has not yet been created) or, for example, "2" (in the case where the capacity of the index file reaches the upper limit) is substituted for each of the parameters $I_L$ and $A_L$. Thereby, for example, an index file 1 or an index file 2, in which data d is to be written, is newly created, and an actual data file 1 or an actual data file 2 corresponding to the index file 1 or index file 2 is newly created (step S3).

Hereinafter, the description will be given by using, as an example, the index file 2 and the actual data file 2 corresponding to the index file 2.

Next, data d that is a write target is additionally written to an end of the newly created actual data file 2 (or to a beginning of the newly created actual data file 2 if there is no written data d), and the position of the actual data file 2, in which the data d is written, is substituted for the parameter $POSA_L$ for position information (step S4).

Then, as index information IJ, "date/time (time instant t at which data d is generated), size (amount of data d) and read start position (parameter $POSA_L$ in which position information POS of a position where data d is written in the actual data file 2 is stored)" are additionally written to a last line of the index file 2 (or a first line if there is no written data d) (step S5), and a generation time instant t of latest data d written in the actual data file 2 is substituted for the parameter $t_L$ (step S6), thus preparing for a write process of data d which is generated at the next time instant.

Specifically, at this time point, the value of the parameter $t_L$ becomes a latest data generation time instant t among written data d recorded in the actual data recording unit 12*b*.

On the other hand, in step S1, if the time instant t of the generation of the data d by the device 30 is earlier than the $t_L$ (step S1, NO), i.e. if it is determined that part of the data d arrives at the information accumulation apparatus 10 with a delay, the processing result of the subroutine A(t) (an index file name (data sequence composed of date/time) in which data d generated at time instant t is to be written) is substituted for the $I_t$ (step S7).

Next, based on the processing result by the subroutine $B(I_t, t)$ (the position information POS of data d to be written, which is described in the index information IJ including the time instant t, based on the index file searched and acquired in the subroutine A(t)) is substituted for the parameter $POSI_t$ (step S8).

Thereafter, the data d generated at the time instant t is additionally written to an end in the actual data file having the file name corresponding to the index file name acquired in step S7, and position information POS of this end is substituted for the parameter $POSA_t$ (step S9). Specifically, the parameter $POSA_t$ becomes position information of the end to which the data d is written in the actual data file.

In addition, "date/time (time instant t at which data d is generated), size (amount of data d) and read start position (parameter $POSA_t$ of the end)" are written by interrupt to that line in the index file, which corresponds to the parameter $POSI_t$ (step S10).

In this manner, the write process (step S1 (YES)→step S2 to step S6) in the case where the data d arrive in the order of time instants of generation of the data d can be executed by the postscript of the index information IJ to the index file and the postscript of the data d to the actual data file, or, in addition to these postscripts, by only the accumulation of generated data d by the new creation of the index file and actual data file. Thus, memory copy involved in sort, insert, etc., does not occur, and data d can be quickly written.

In addition, even when the generated data d do not arrive at the information accumulation apparatus 10 in the order of time instants of generation of the generated data d and the time instants of arrival are reversed (step S1 (NO)→step S7 to step S10), for example, the index file, in which data d is to be written, and the position information POS at which the data d is to be inserted, can be quickly specified by the binary search. This is because the system call of the OS, such as the binary search, is utilized by using the fact that each line of the index file and index information IJ1 to index information IJm has a fixed length. Thereby, high-speed move of existing data d, and high-speed write of new data d can be achieved.

[Read Process $(t_s, t_e)$]

Figure 8A:
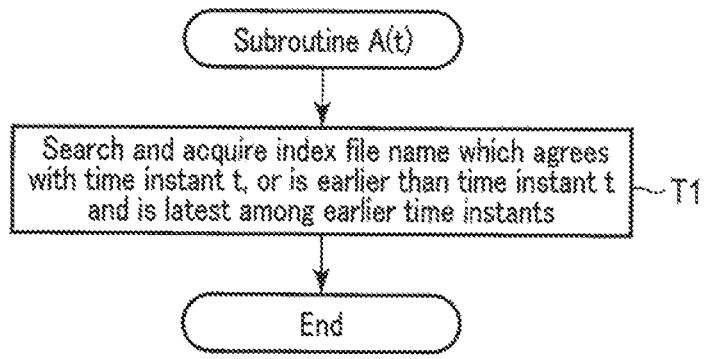
FIG. 8A is a flowchart illustrating a processing step (a subroutine) used in a read process of data d of the information accumulation apparatus 10.
Figure 8B:
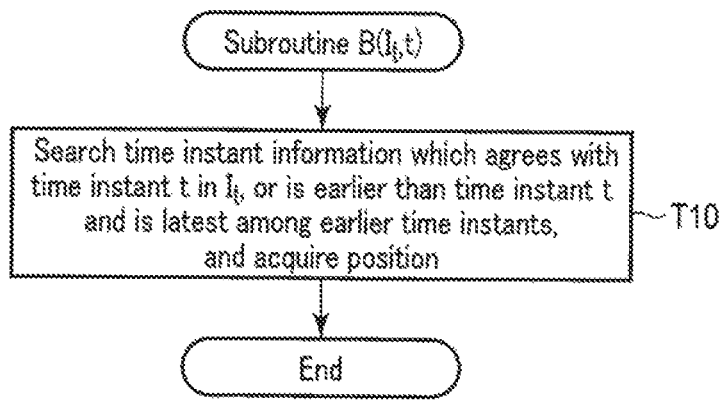
FIG. 8B is a flowchart illustrating a processing step (a subroutine) used in the read process of data d of the information accumulation apparatus 10.
Figure 8C:
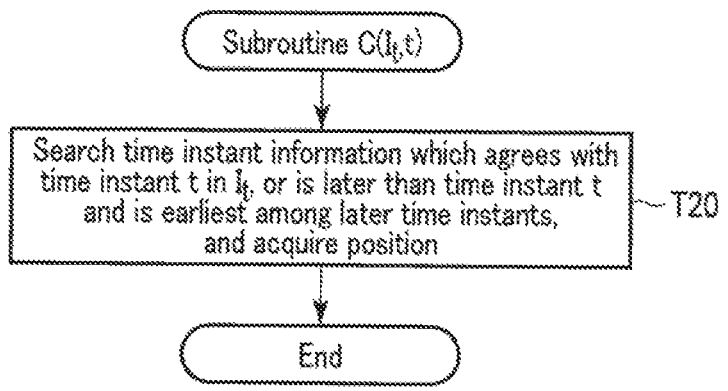
FIG. 8C is a flowchart illustrating a processing step (a subroutine) used in the read process of data d of the information accumulation apparatus 10.

FIG. 8A, FIG. 8B and FIG. 8C are flowcharts illustrating processing steps (subroutines) used in a read process (steps U1 to step U17 to be described later) of data d.

Specifically, FIG. 8A illustrates a subroutine A(t) for searching and acquiring an index file which is a read target. FIG. 8B and FIG. 8C illustrate a subroutine $B(I_t, t)$ and a subroutine $C(I_t, t)$ for searching a line of index information IJ including a time instant t as a data sequence, among index information described in the searched and acquired index file.

Figure 9:
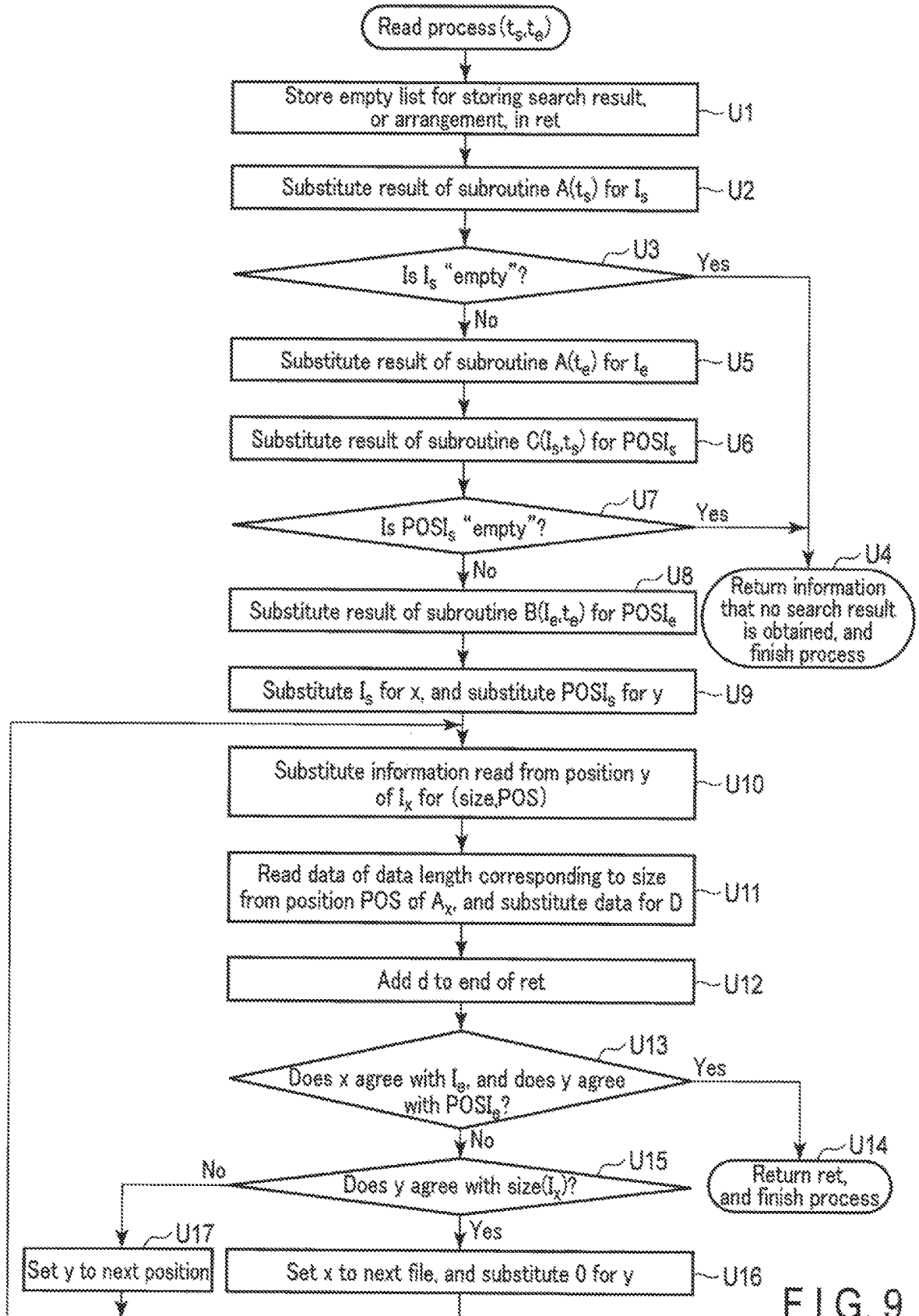
FIG. 9 is a flowchart illustrating a read process of data d written in the actual data recording unit 12b.

FIG. 9 is a flowchart illustrating a read process of data d written in the actual data recording unit 12*b*, including the subroutine A(t) to subroutine $C(I_t, t)$.

Specifically, this flowchart is a flowchart in which if a time range T (start time instant $t_s$ and end time instant $t_e$) is set by a read request of data d by the user, the time range T is designated as a query, and the data d generated in the time range T is read.

In this manner, the read process of data d is executed by designating the time range T of the start time instant $t_s$ to the end time instant $t_e$ as the query. Thus, in the subroutines A(t), B(t) and C(t) to be described below, a process, in which both the start time instant $t_s$ and the end time instant $t_e$ of the read of data d are designated, or one of the time instants t (one of $t_s$ or $t_e$) is designated, is executed.

In the subroutine A(t) illustrated in FIG. 8A, both the start time instant $t_s$ and the end time instant $t_e$ of data d are designated. Specifically, subroutines $A(t_s)$ and $A(t_e)$ are executed.

Here, in FIG. 8A, FIG. 8B, FIG. 8C and FIG. 9, $I_s$: an index file including index information IJ of data d generated at a time instant $t_s$, $POSI_s$: a position at which index information IJ of data d generated at the time instant $t_s$ in $I_s$ is recorded, $A_s$: an actual data file in which data d generated at the time instant $t_s$ is recorded, $POSA_s$: a position at which data d generated at the time instant $t_s$ in $A_s$ is recorded, $I_e$: an index file including index information IJ of data d generated at a time instant $t_e$, $POSI_e$: a position at which index information IJ of data d generated at the time instant $t_e$ in $I_e$ is recorded, $A_e$: an actual data file in which data d generated at the time instant $t_e$ is recorded, and $POSA_e$: a position at which data d generated at the time instant $t_e$ in $A_e$ is recorded.

To begin with, if the subroutine $A(t_s)$ is executed, an index file name, in which index information IJ including a time instant that agrees with the read start time instant $t_s$ of data d or that is earlier than the start time instant $t_s$ and is latest among the earlier time instants is recorded, is searched and acquired (step T1).

A similar process is executed with respect to the end time instant $t_e$. Specifically, if the subroutine $A(t_e)$ is executed, an index file name, in which index information IJ including a time instant that agrees with a read end time instant $t_e$ of data d or that is earlier than the end time instant $t_e$ and is latest among the earlier time instants is recorded, is searched and acquired (step T).

Accordingly, by the subroutines $A(t_s, t_e)$, as a search result, one index file (e.g. only index file 1) or index files (e.g. index file 1 and index file 2) are obtained as index files of read targets.

Next, in the subroutine $B(I_e, t)$ illustrated in FIG. 8B, the read end time instant $t_e$ of data d is designated.

If the subroutine $B(I_e, t_e)$ is executed, from the index file searched and acquired by the subroutine $A(t_e)$, position information POS of index information IJ, in which a time instant which agrees with the read end time instant $t_e$ or which is earlier than the read end time instant $t_e$ and is latest in the index file is described, is acquired (step T10).

In the subroutine $C(I_s, t_s)$ illustrated in FIG. 8C, the read start time instant $t_s$ of data d is designated.

If the subroutine $C(I_s, t_s)$ is executed, from the index file searched and acquired by the subroutine $A(t_s)$, position information POS of index information IJ, in which a time instant which agrees with the read start time instant $t_s$ or which is earlier than the read start time instant $t_s$ and is earliest among the earlier time instants is described, is acquired (step T20).

Based on the above-described subroutine $A(t_s, e)$ to subroutine $C(I_s, t_s)$, a read process of data d illustrated in FIG. 9 is then executed.

To start with, an empty list list for storing data d to be read in the present read process, or an arrangement ar, is stored in a parameter ret (step U1).

Next, a search result (an index file name (data sequence composed of date/time) that is a read start target) acquired by the subroutine $A(t_s)$ is substituted for a parameter $I_s$ (step U2).

However, when an index file that is a read target is not acquired in the subroutine $A(t)$ and the parameter $I_s$ is "empty" (step U3, YES), information to the effect that no search result is obtained is sent to the application 50 via the Web server 40 (step U4).

On the other hand, when a search result acquired by the subroutine $A(t_s)$ is stored in the parameter $I_s$ (step U3, NO), a search result of the subroutine $A(t_e)$ (an index file that is a read end target) is substituted for a parameter $I_e$ (step U5), and then a search result of the subroutine $C(I_s, t_s)$ (position information POS of index information IJ which agrees with the read start time instant $t_s$, or position information POS in which an earliest time instant in the index file is described) is substituted for a parameter $POSI_s$ (step U6).

However, when the position information POS corresponding to the time instant $t_s$ is not acquired in the subroutine $C(I_s, t_s)$ and the parameter $POSI_s$ is "empty" (step U7, YES), information to the effect that no search result is obtained is sent to the application 50 via the Web server 40 (step U4).

On the other hand, when the search result is stored in the parameter $POSI_s$ (step U7, NO), a search result of the subroutine $B(I_e, t_e)$ (position information POS of index information IJ in which a time instant, which agrees with the read end time instant $t_e$ or which is earlier than the read end time instant $t_e$ and is latest in the index file, is described) is then substituted for a parameter $POSI_e$ (step U8). Thereby, in the parameter $POSI_e$, the position information POS, in which data d corresponding to the end time instant $t_e$ is written, is stored.

Thereafter, the value of the parameter $I_s$ (designating the index file including the start time instant $t_s$) is substituted for a parameter x, and the value of the parameter $POSI_s$ (position information POS of index information IJ which agrees with the read start time instant $t_s$, or position information POS in which the earliest time instant in the index file is described) is substituted for a parameter y (step U9).

Hereinafter, the value substituted for the parameter x is referred to as "parameter $I_x$".

Thereafter, the size of the data d which is read according to the parameter $I_x$ and parameter y, and the (start and end) positions of the read data d are substituted for a parameter (Size, POS) (step U10).

Further, according to the parameter (Size, POS), the data d recorded in the actual data file is read, and the read data d is substituted for a parameter D (step U11).

Thereafter, the data d substituted for the parameter D is additionally written to the end of the parameter ret (the beginning of the parameter ret in the case of first read) (step U12).

Then, it is determined whether the "index file name (data sequence of date/time) including the start time instant $t_s$" stored in the parameter x agrees with the "index file name (data sequence of date/time) including the end time instant $t_e$" stored in the parameter $I_e$" (i.e. the read target is complete in one index file), and the "read start position $POSI_s$ of index information IJ" stored in the parameter y agrees with the "read end position $POSI_e$ of index information IJ" stored in the parameter $POSI_e$ (index information IJ of one line is a read target) (step U13).

As a result of step U13, if it is determined that the respective conditions are satisfied, i.e. if the data d of the read target is complete in the index information IJ of one line in a certain single index file (step U13, YES), the data d additionally written to the parameter ret in step U12 is sent to the application 50 via the Web server 40 (step U14).

On the other hand, in step U13, if it is determined that any one of the conditions is not satisfied (step U13, NO), it is first determined whether the read start position $POSI_s$ of data d stored in the parameter y agrees with the last line, i.e. the m-th line, of the index file that is a search target (step U15).

If the start position $POSI_s$ is not the m-th line (step U15, NO), y=y+1 is set, and the index information IJ of the read target is lowered by one line (step S17). The process returns to step U10, and the read process of the data d with respect to the index information IJ in the line lowered by one line is executed.

Specifically, in the index file of the read target, the data d of a data length corresponding to the parameter Size is read from the corresponding actual data file according to the index information IJ lowered by one line, and then the read data d is stored in the parameter D, and the data d is added to the end of the parameter ret (step S10→step U11→step U12).

Thereafter, if it is determined that the "read start position $POSI_s$ of index information IJ" in the line lower by one line at the time of y=y+1 agrees with the "read end position $POSI_e$ of index information IJ" stored in the parameter $POSI_e$ (step U13, YES), the data d corresponding to the index information IJ of, e.g. two lines, which is added to the parameter ret in step U12, is sent to the application 50 via the Web server 40 (step U14).

In addition, when the start position $POSI_s$ is the m-th line (step U15, YES), the number of index files which are read targets is two or more. Thus, x=x+1 is set, and the index file that is the read target is set to be a neighboring index file, and "0 line" is substituted for the value of y, i.e. the start position $POSI_s$ (step U16). Thereby, the operation of step U10 onwards is executed from the beginning line (first line) of the index file that is the read target.

By executing the above read process, the data d generated in the time range T designated by the user can be read.

[Read Process ($t_{req}$)]

Figure 10A:
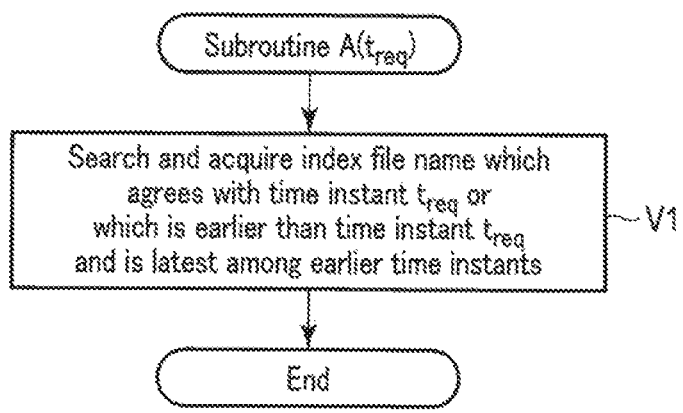
FIG. 10A is a flowchart illustrating a processing step (a subroutine) for executing a read process of the data d of the information accumulation apparatus 10.
Figure 10B:
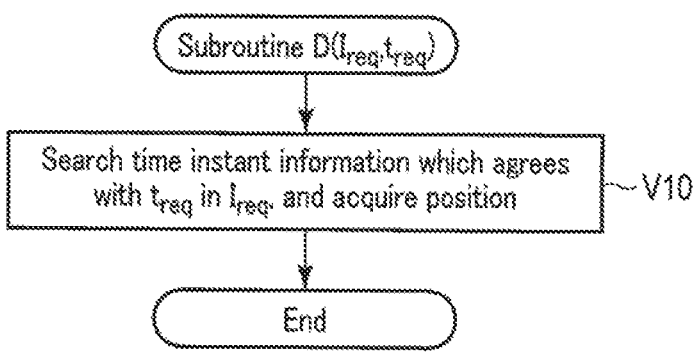
FIG. 10B is a flowchart illustrating a processing step (a subroutine) for executing the read process of the data d of the information accumulation apparatus 10.

FIG. 10A and FIG. 10B are flowcharts illustrating processing steps (subroutines) for executing a read process (steps X1 to step X9 to be described later) of data d generated at a specific time instant $t_{req}$ designated by the user.

Specifically, FIG. 10A illustrates a subroutine $A(t_{req})$ for searching and acquiring an index file which is a read target, based on the time instant $t_{req}$. FIG. 10B illustrates a subroutine $D(I_{req}, t)$ for searching a line of index information IJ including the time instant $t_{req}$, in the searched and acquired index file.

Figure 11:
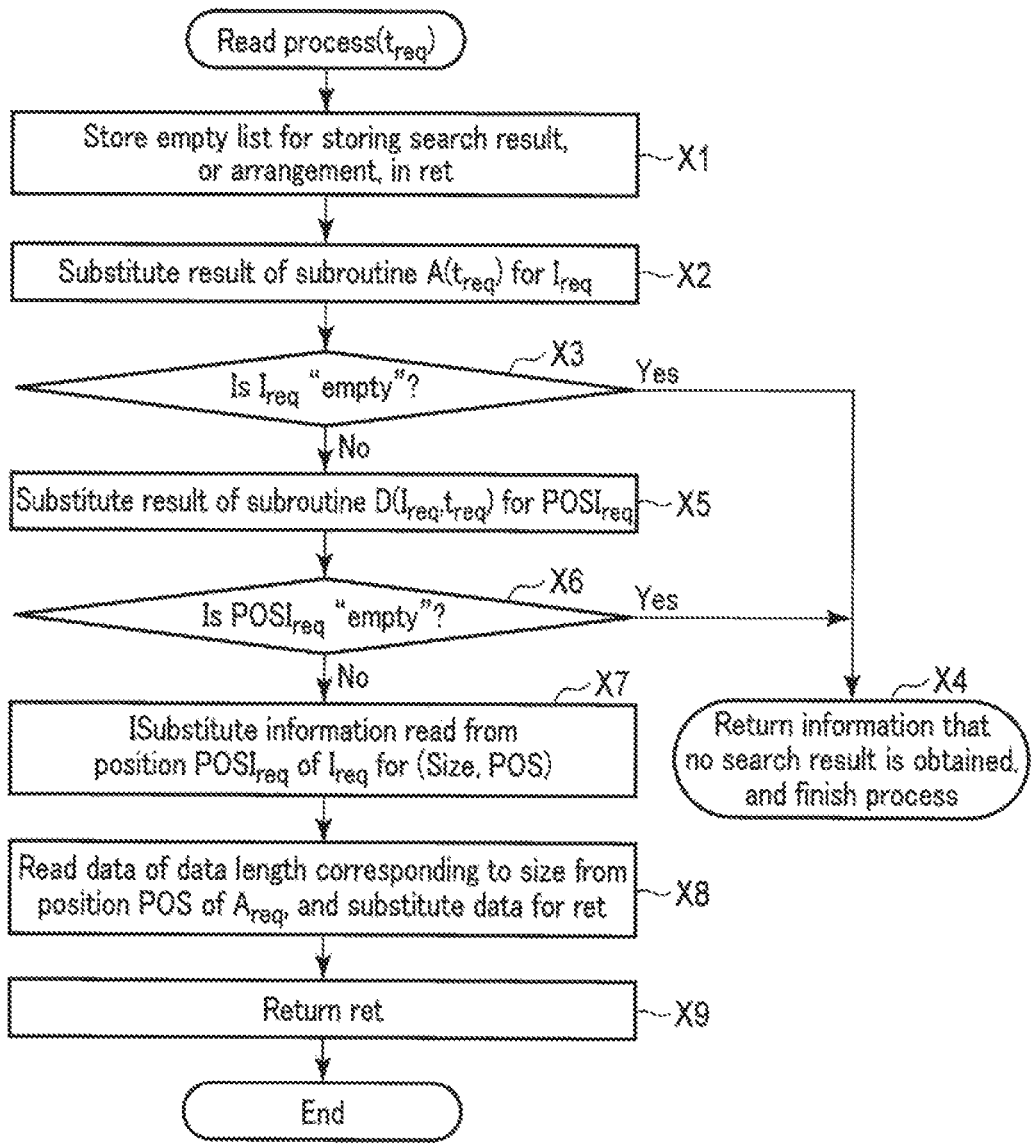
FIG. 11 is a flowchart illustrating a read process of data d written in the actual data recording unit 12b.

FIG. 11 is a flowchart illustrating a read process of data d written in the actual data recording unit 12b, including the subroutine A(t) and subroutine $D(I_{req}, t)$.

Here, unlike FIG. 8A, FIG. 8B, FIG. 8C and FIG. 9 (read process ($t_s$, $t_e$), since a read process of data d at a specific time instant $T_{req}$ as a query, the respective processes of the subroutines $A(t_{req})$ and $D(I_{req}, t_{req})$ described below are executed based on the time instant $T_{req}$.

Here, in FIG. 10A, FIG. 10B and FIG. 11, $I_{req}$: an index file including index information IJ of data d generated at a time instant $t_{req}$, $POSI_{req}$: a position at which index information IJ of data d generated at the time instant $t_{req}$ in $I_{req}$ is recorded, $A_{req}$: an actual data file in which data d generated at the time instant $t_{req}$ is recorded, and $POSA_{req}$: a position at which data d generated at the time instant $t_{req}$ in $A_{req}$ is recorded.

To begin with, if the subroutine $A(t_{req})$ illustrated in FIG. 10A is executed, an index file name is searched and acquired, which includes a time instant that agrees with a designated read time instant $t_{req}$ or that is earlier than the time instant $t_{req}$ and is latest among the earlier time instants (step V1).

In addition, if the subroutine $D(I_{req}, t_{req})$ illustrated in FIG. 10B is executed, position information POS described in index information IJ, which includes a time instant t that agrees with the time instant $t_{req}$ in the index file searched and acquired by the subroutine $A(t_{req})$, is acquired (step V10).

Based on the above-described subroutine $A(t_{req})$ and subroutine $D(I_{req}, t_{req})$, a read process illustrated in FIG. 11 is executed as described below.

To start with, an empty list list for storing data d to be read out in the read process, or an arrangement ar, is stored in a parameter ret (step X1).

Next, a search result (an index file name (data sequence composed of date/time) that is a read target) acquired by the subroutine $A(t_{req})$ is substituted for a parameter $I_{req}$ (step X2).

However, when an index file name that is a read target is not acquired in the subroutine $A(t_{req})$ and the parameter $I_{req}$ is "empty" (step X3, YES), information to the effect that no search result is obtained is sent to the application 50 via the Web server 40 (step X4).

On the other hand, when the search result is stored in the parameter $I_{req}$ (step X3, NO), a search result of the subroutine $D(I_{req}, t_{req})$ (position information POS described in the index information IJ including the time instant $t_{req}$) is substituted for a parameter $POSI_{req}$ (step X5).

As a result of step X5, if the position information POS corresponding to the index information IJ including the time instant $t_{req}$ is not acquired in the subroutine $D(I_{req}, t_{req})$ and the parameter $POSI_{req}$ is "empty" (step X6, YES), information to the effect that no search result is obtained is sent to the application 50 via the Web server 40 (step X4).

On the other hand, when the search result (the position information POS corresponding to the index information IJ including the time instant $t_{req}$) is stored in the parameter $POSI_{req}$ (step X6, NO), the "size" and "read start position" described in the index information including the time instant $t_{req}$ are substituted for a parameter (Size, POS) (step X7).

Thereafter, according to the parameter (Size, POS), the data d of the data length corresponding to the parameter Size, which is recorded in the actual data file having the file name corresponding to the index file name, is read, and the read data d is substituted for the parameter ret (step X8).

At last, the value stored in the parameter ret (the data d of the read target) is sent to the application 50 via the Web server 40 (step X9).

In this manner, since the file names that are set for the index file 1 to index file n are the time instants of generation of data d, the index file having the target index information IJ can easily and quickly specified by performing the binary search, based on the time instant $t_{req}$ for the read target. Thus, the recording position of the data d of the read target can easily and quickly be understood.

Thus, according to the information accumulation apparatus 10 with the above configuration, when the data d generated by the devices 30 arrive in the order of time instants t of generation, the data d are additionally described (written) to the actual data file 12 in the order of arrival of the data d, and the generation time instants t of the data d that are additionally written in the actual data file, the data sizes, and the positions of postscript in the actual data file are additionally written, as index information IJ, in the index file having the file name corresponding to the actual data file in which the data d are recorded.

Thereby, it should suffice if the index information IJ of the data d is simply generated in the order of arrival of the data d, and the data d are additionally written to the actual data file. In addition, when the capacity of the index file or actual data file reaches the limit, a new index file and a new actual data file are created and the generated data d are simply accumulated in these files. Thus, memory copy due to sort, insert or the like does not occur, and high-speed write of data d is enabled.

In addition, the data recording unit 12 includes the actual data recording unit 12b in which one BLOB data is recorded in one actual data file.

By adopting this configuration, the data d generated by the devices 30 and the BLOB data, such as images and moving images, can be processed by a common database. $I_t$ is thus possible to solve, for example, such a problem that it is difficult to accumulate the data d and BLOB data by a common scheme because of differences in size and characteristic.

In addition, even when the arrival time instants of the generated data d to the information accumulation apparatus 10 are interchanged, since each index file name is composed of the binary data of the fixed length, the file in which the data d to be written is inserted and the position of insertion can quickly be specified by the binary search. In this manner, by making use of the fact that the index file name and each line of index information IJ1 to index information IJm have fixed lengths, high-speed move of existing data d and high-speed write of new data d can be performed by the system call of the OS, such as the binary search.

Further, according to the information accumulation apparatus 10 with the above configuration, the file name of the index file and the file name of the actual data file are set based on the time instant t of generation of data d. Thus, the index file including the time instant t and the index information IJ in this index file can easily be searched by designating the time instant t. In addition, since the position POS at which the data d is written is described in the index information IJ, the data d can easily be read out, based on the searched index information IJ.

Aside from the case where the time instant $t_{req}$ for the read target is designated, the same applies to the case where the start time instant $t_s$ and the end time instant $t_e$ are designated and the data d written in the time range T there between are read.

For example, when there are a plurality of actual data files corresponding to the index file, these actual data files may be gathered into one directory, and the name of the directory may be set to be a name which is correlated with the corresponding index file name by a rule which enables unique conversion with a small calculation amount. Thereby, the actual data file can uniquely be determined, and the data d can quickly be read.

In addition, the area ($POSA_L$) in the actual data file, where the data d is recorded, may be indicated by an area represented by a combination of the "size" and "read start position" described in the index information IJ.

The size of the index information IJ, which is a data sequence of a fixed length, may be set to be a page unit, or set to be a divisor of the page unit.

Besides, for example, the index file 1, which is recorded in the index recording unit 12a, may be divided. In this case, such a configuration may be adopted that two index files, which are generated by dividing the index file 1, correspond to the actual data file 1.

The present invention is not limited to the above-described embodiments, and can be variously modified without departing from the scope of the present invention in practical stages. Furthermore, the above-described embodiments incorporate inventions of various stages, and various inventions can be extracted by proper combinations of the disclosed constituent elements. For example, even if some constituent elements are omitted from all the constituent elements disclosed in the embodiments or some constituent elements are combined in other modes, a configuration from which some constituent elements are omitted or in which some constituent elements are combined can be extracted as an invention if the above-described problems to be solved by the invention can be solved and the above-described advantages of the invention can be obtained.

Besides, the methods described in the above embodiments can be stored as computer-executable programs (software means) in a storage medium, such as a magnetic disk (floppy (trademark) disk, hard disk, etc.), an optical disc (CD-ROM, DVD, MO, etc.), or a semiconductor memory (ROM, RAM, flash memory, etc.), and can be distributed by transmission via a communication medium. Note that the programs stored in the medium side include a setup program which constitutes in the computer software means (including not only an execution program but also a table structure and a data structure) that the computer is caused to execute. The computer that realizes the present apparatus reads in the program which is stored in the storage medium, and, in some cases, constructs the software means by the setup program. The operation of the computer is controlled by the software means, thereby executing the above-described processes. The storage medium described in the present specification includes not only a storage medium for distribution, but also a storage medium, such as a magnetic disk or a semiconductor memory, which is provided in the computer or in a device connected via a network.

The invention claimed is:

1. An information accumulation apparatus comprising:
    a non-transitory data recording medium having a data recording area, the data recording area including:
    an index recording area to be used to record an index file including index information which is a data sequence including a time instant of generation of data by a device of a data transmission source, and position information indicative of an area in which the data is to be written after data reception, the index information being arranged in an order of time instants of generation of the data, the index file including a file name corresponding to the time instant of the generated data, and
    an actual data recording area to be used to record an actual data file including a file name having a rule which enables unique and mutual correlation by a first calculation amount with the file name of the index file, the actual data file being configured such that the data is written to the area indicated by the position information described in the index information; and
    a computer processor that functions as a write processor and as a read processor,
    the write processor being configured to write the data to the actual data file, and to write the position information indicative of the area in which the data is written in the actual data file, and the time instant of the generation of the data, to the index file as the index information, and
    the read processor being configured to read, when data that is a read target is designated based on a time instant, the data from the actual data file, based on the index information in the index file including the file name corresponding to the time instant.

2. The information accumulation apparatus of claim 1, wherein the index information, which is the data sequence including the time instant of the generation of the data and the position information indicative of the area in which the data is to be written, is a data sequence of a fixed length.

3. The information accumulation apparatus of claim 1, wherein the write processor is configured to additionally write the data to the actual data file in an order of time instants of the generated data.

4. The information accumulation apparatus of claim 1, wherein
    as a process which is executed when a time instant of generation of data that is a write target to the actual data file is earlier than a time instant included in the index information written in a first line of the index file,
    the write processor is configured to execute:
    an index file search to search an index file in which the index information is to be inserted, based on the time instant of the generation of the data;
    an index information insertion line search to search a line in which the index information including the time instant of the generation of the data that is the write target is to be inserted in the index file searched by the index file search; and
    an index information insertion to write the data in the actual data file of a file name having the rule which enables the unique and mutual correlation by the first calculation amount with a file name of the index file searched by the index file search, and to insert index information including a time instant of generation of the written data, and position information indicative of an area in which the data is written, into the line in the index file, into which the index information is to be inserted and which is searched by the index information insertion line search.

5. The information accumulation apparatus of claim 1, wherein as a process which is executed when a time instant of generation of data that is a write target to the actual data file is later than a time instant included in the index information written in a first line of the index file, the write processor is configured to execute:

an index information insertion line search to search a line in which the index information including the time instant of the generation of the data that is the write target is to be inserted in the index file, based on the time instant of the generation of the data; and an index information insertion to write the data in the actual data file of a file name having the rule which enables the unique and mutual correlation by the first calculation amount with a file name of the index file searched by an index file search, and to insert index information including a time instant of generation of the written data, and position information indicative of an area in which the data is written, into the line in the index file, into which the index information is to be inserted.

6. The information accumulation apparatus of claim 1, wherein the read processor is configured to execute:

a file determination to determine, when a read start time instant and an end time instant of data that is a read target are designated, index information including the start time instant and the end time instant is in an identical index file or not;

an actual file data read to read, when it is determined by the file determination that the index information including the start time instant and the end time instant of the data is included in the identical index file, data from the actual data file according to the index information including the start time instant and the end time instant; and a multiple actual file data read to read, when it is determined by the file determination that the index information including the start time instant and the end time instant of the data exists over a plurality of index files, data from the actual data files according to the index information including the start time instant and the end time instant.

7. The information accumulation apparatus of claim 1, wherein the read processor is configured to execute:

an actual data file search to search, when a read time instant of data that is a read target is designated, the actual data file, based on the index information including the time instant; and a data read to read the data of the designated time instant from the actual data file searched by the actual data file search, based on the index information.

8. The information accumulation apparatus of claim 1, wherein a file size of the index file is a multiple of a paging size of an OS.

9. A data processing system comprising:

a data generation apparatus of a data transmission source, which generates a time instant and data corresponding to the time instant; and an information accumulation apparatus configured to receive the data generated by the data generation apparatus, to write the data in an actual data file, and to read the written data in response to a read request from an outside, the information accumulation apparatus comprising:

a non-transitory data recording medium having a data recording area, the data recording area including:

an index recording area to be used to record an index file including index information which is a data sequence of a fixe length including position information indicative of an area in which the data generated by the data generation apparatus is to be written after data reception, and a time instant of generation of the data, the index information being arranged in an order of time instants of generation of the data, the index file including a file name corresponding to the time instant of the generated data, and an actual data recording area to be used to record an actual data file including a file name having a rule which enables unique and mutual correlation by a first calculation amount with the file name of the index file, the actual data file being configured such that the data is written to the area indicated by the position information described in the index information; and a computer processor that functions as a write processor and as a read processor, the write processor being configured to write the data to the actual data file, and to write the position information indicative of the area in which the data is written in the actual data file, and the time instant of the generation of the data, to the index file as the index information, and the read processor being configured to read, when the read request based on a time instant is received, the data from the actual data file, based on the index information in the index file including the file name corresponding to the time instant.

10. A non-transitory computer-readable storage medium having a program stored thereon which controls a computer of an information accumulation apparatus, to perform functions comprising:

recording, in an index recording area of a data recording area, an index file including index information which is a data sequence including a time instant of generation of data by a device of a data transmission source, and position information indicative of an area in which the data is to be written after data reception, the index information being arranged in an order of time instants of generation of the data, the index file including a file name corresponding to the time instant of the generated data;

recording, in an actual data recording area of the data recording area, an actual data file including a file name having a rule which enables unique and mutual correlation by a first calculation amount with the file name of the index file, the actual data file being configured such that the data is written to the area indicated by the position information described in the index information;

writing the data to the actual data file, and to write the position information indicative of the area in which the data is written in the actual data file, and the time instant of the generation of the data, to the index file as the index information; and reading, when data that is a read target is designated based on a time instant, the data from the actual data file, based on the index information in the index file including the file name corresponding to the time instant.

* * * * *